Patented Jan. 7, 1941

2,227,690

UNITED STATES PATENT OFFICE 2,227,690

DIESEL LUBRICANT

Maurice H. Arveson, Flossmoor, Ill., assignor to Standard Oil Company, Chicago, Ill., a corporation of Indiana No Drawing. Application October 6, 1938, Serial No. 233,585

10 Claims. (Cl. 252—59)

This invention relates to the lubrication of internal combustion engines and more particularly internal combustion engines of the compression ignition type commonly known as Diesel engines.

The principal characteristic of compression-ignition engines which differentiates them from other internal combustion engines is the use of high compression sufficient to heat the air in the cylinder adiabatically to a temperature above the ignition point of the fuel. In order to accomplish this it is necessary in these engines to employ compression ratios of 10 to 1 and higher, even as high as 20 to 1, although in ordinary practice compression ratios of between 12 to 1 and 14 to 1 are used. With compression ratios of this magnitude the compression pressure developed is commonly about 500 pounds per square inch, although pressures of 375 to 400 pounds per square inch may be employed in engines of large size. Pressures of 800–900 pounds per square inch have been employed experimentally, but cannot be used in practice because of mechanical difficulties and particularly because of lubrication failure hereinafter more fully described.

When employing such high cylinder pressures it is impracticable to introduce the entire fuel charge at one time because the combustion pressure developed would exceed the strength of the engine parts and also produce severe detonation. Therefore in Diesel engines the fuel is injected gradually, extending over a considerable portion of the power stroke with a view to maintaining a relatively constant pressure during combustion. As a result of the combustion being extended over a considerable period, the absorption of heat by the piston is much greater than in ordinary internal combustion engines and serious difficulty has been encountered in maintaining proper lubrication of the piston and piston rings. Piston temperatures behind the top ring have been measured as high as 500° F., a temperature sufficiently high to produce coking of ordinary lubricating oils. The problem is even more severe in the case of two cycle engines than with four cycle engines because of the shorter time allowed between combustion periods for cooling of the piston.

Numerous methods have been tried for preventing carbonization of Diesel engine pistons by decomposition of the lubricating oil. It is common practice, for example, to place the top ring or compression ring an appreciable distance from the top of the piston. Another device is to employ exceptionally long pistons, for example a piston length of one and a half times the diameter, in order to provide greater area of contact with the cooled cylinder walls, thus assisting in dissipating the heat. Still another method is to provide a deep groove in the piston above the top compression ring so that flow of heat from piston crown to rings is retarded by the thinner section of metal. Such grooves are called "heat grooves" or "heat traps." The piston crown thus runs at very high temperatures to which the oil is exposed on the under side, making necessary great resistance to carbon formation.

A larger number of rings is customarily employed on Diesel pistons than is used in ordinary internal combustion engines in order to provide better contact with the cylinder wall for conduction of heat; also to provide substitute rings to maintain compression in case the top compression ring becomes jammed with carbon and thereby rendered inoperative. In Diesel engine practice, for example, it is common practice to employ five or six rings on the piston, whereas in ordinary gas engine practice three rings usually are sufficient. Devices for cooling Diesel pistons are commonly employed and are quite essential in the larger engines having pistons of ten inches in diameter or more, in which case oil stream may be directed against the piston or water may be circulated through passages in the piston, employing telescoping pipe connections for the purpose. Such devices, however, are impractical in the smaller high speed type engines which are the principal subject of this invention.

Perhaps the most important means which has been adopted for avoiding carbonization of Diesel engine pistons is the selection of the lubricating oil employed therefor. Heretofore it has been general practice to employ oils of the naphthenic or coastal type in the lubrication of Diesel engines rather than the paraffinic oils. In fact, Pennsylvania oils have been generally avoided for Diesel engine lubrication although they have commanded a premium for the lubrication of other internal combustion engines. The choice of naphthenic oils has been based largely on the fact that they produce less carbon around the piston rings. Various theories have been advanced to account for this, the most plausible explanation being that the naphthenic oils have a higher vapor pressure for a given viscosity and therefore distil away from hot surfaces sufficiently rapidly to prevent serious carbonization. Volatility considerations have also prompted the use of relatively light oils in comparison with the oils used for other internal combustion engines. Thus in the lubrication of Diesel engines of the high speed type oils of 20 and 30 S. A. E. grade are commonly used rather than the heavier oils of 40 and 50 S. A. E. grades whose volatility is considerably less.

Now it is well understood that for the lubrication of engine parts operating at high temperatures such as Diesel engine pistons the most desirable oil would ordinarily be an oil suffering the least change in viscosity with increase in temperature and therefore, measured by this criterion, the naphthenic or coastal oils having very low viscosity indices, for example 0 to 20 Dean and Davis, would ordinarily be avoided. However, the higher volatility of these naphthenic oils is such an important factor in Diesel engine operation that their use is commonly required in spite of their low viscosity index. Attempts to employ oils of higher viscosity index for high speed Diesel lubrication have generally failed because of the low volatility which characterizes such oils, resulting in deposition of hard carbon on the piston rings and in the ring grooves, thus requiring frequent shutting down of the engine for cleaning and overhauling. Inasmuch as Diesel engines find their most important use in installations requiring continuous operation, such as in electric power plants, long distance trucking and bus service, tractor and marine duty, etc., it is especially inconvenient and costly to shut them down for overhauling and therefore every effort has been made by Diesel engine manufacturers and operators to avoid doing so.

One object of the invention is to provide a method of lubricating Diesel engines by employing a lubricant which will satisfy the requirements for lubricating the piston and other moving parts of the engine and at the same time will produce little or no carbon deposits on the piston and piston rings which are exposed to high temperatures.

Another object of the invention is to provide a lubricant of higher viscosity than previously used which will more perfectly seal the piston in the cylinder of the engine, thus reducing the extent of "blow by" and enabling the engine to operate more efficiently, especially at low speeds and under low load conditions.

Still another object of the invention is to permit operating compression-ignition engines with higher compression ratios, higher loads and corresponding higher piston temperatures without serious deposition of coke in the piston rings and on the piston which would otherwise jam the piston rings and cause the pistons to seize and score the cylinder walls.

Still another object of the invention is to provide a method of lubricating Diesel engines of the high speed type operating at 700 to 2400 R. P. M. Other objects of the invention will be observed from the following description.

I have discovered that the foregoing objects can be attained by providing a Diesel engine lubricant comprising a blend of a paraffinic lubricating oil of a particular specification and a synthetic lubricating oil obtained by the polymerization of iso-olefines, particularly iso-butylene in the presence of a catalyst, such as boron fluoride at temperatures of from about 0° F. to about 100° F. The paraffinic oil should have a 90% distillation temperature (determined as hereinafter set forth) of not more than about 500° F., preferably not more than about 470° F., and a viscosity index greater than about 70 and preferably about 85. The synthetic oil should have a 90% distillation temperature of not more than about 700° F., and preferably 600° F.

The 90% distillation temperature is a measure of the tendency of lubricating oils to form carbon in internal combustion engines, and is determined by distilling a 100 gram sample of the oil at 1 millimeter mercury pressure and determining the temperature of the vapor when 90% has distilled over. The test is described in detail by W. H. Bahlke et al. in the S. A. E. Journal, vol. 29, 1931 (page 215). The work of Bahlke et al. which was conducted with various oils both natural and synthetic showed that the carbon forming tendency of an oil was substantially in reverse proportion to the volatility of the oil. The volatility test as reported by W. H. Bahlke et al. supra has proved to be an accurate index of the carbon forming tendency of oils in internal combustion engine service.

The viscosity indices are determined by the method of Dean and Davis as described in Chemical and Metallurgical Engineering, vol. 36, 1929 (page 618).

The synthetic oil which I prefer to employ is made as hereinbefore stated by polymerizing liquid isobutylene with boron fluoride. In carrying out this part of the process, liquid isobutylene is maintained under pressure and cooled to a temperature, for example, of about 0° C., and about 0.1 to 2% of $BF_3$ is added with vigorous agitation. Excessive rise in temperature due to the heat of reaction may be avoided by efficient cooling. In order to facilitate agitation in handling and to assist in controlling the reaction I prefer to employ a diluent such as hexane, liquid butane, propane, naphtha, etc., using a solution containing about 20% of isobutylene. I may also employ the butane-butylene fraction recovered from petroleum gases, especially those gases produced in the cracking of petroleum oils for the manufacture of gasoline. This light fraction may contain about 10 to 25% of isobutylene, the remainder being principally butanes and normal butylene.

It is preferred to subject the isobutylene to the action of the $BF_3$ catalyst for about 30 minutes and thereafter recover the heavy oily product by neutralization of the excess catalyst and removal of unreacted light hydrocarbons by evaporation. The resulting product is a viscous oil, a typical sample of which has the following characteristics:

Saybolt viscosity at 100° F_____ 1538 seconds
Saybolt viscosity at 210° F_____ 117 seconds
Viscosity index_____about_____ 101
Flash_____ 250° F.
Pour point_____ −35° F.

The undesirable low boiling and high molecular weight constituents of the synthetic viscous oil so obtained are removed by distilling the same under vacuum to produce an oil having the following characteristics.

Saybolt viscosity at 100° F____ 550 to 850 seconds
Saybolt viscosity at 210° F____ 55 to 75 seconds
Viscosity index_____ 91.0
Pour point_____ −35° F.
90% distillation temperature
  about_____ 450° F. to 700° F.

The paraffinic oil may have the following specifications:

Saybolt viscosity at 100° F_____ 536 seconds
Saybolt viscosity at 210° F_____ 65 seconds
Viscosity index_____ 95
90% distillation temperature_____ 500° F.
Flash point_____ 300° F.

The proportions of paraffinic oil and synthetic oil in the blend would depend largely upon the viscosity index of the paraffinic oil, proportionately less high V. I. paraffinic oils being used than lower V. I. paraffinic oils. For example, blends having the following compositions may be used:

| V. I. of paraffinic oil | Percent paraffin oil | | Percent synthetic oil | |
|---|---|---|---|---|
| | Preferred | Range | Preferred | Range |
| 100 | 30 | 10–50 | 70 | 90–50 |
| 85 | 40 | 10–60 | 60 | 90–40 |
| 70 | 60 | 10–80 | 40 | 90–20 |

The above tabulation gives the preferred blend with paraffinic oils of a given viscosity index and the tolerable range of paraffinic oil and synthetic oil. Thus using a paraffinic oil having a viscosity index of 100 the preferred blend is one having 30% paraffin oil and 70% synthetic oil; however, the blend may contain from about 10% to about 50% paraffin oil and from about 50% to about 90% synthetic oil.

The blended oil preferably should have a viscosity within the range of S. A. E. 30 to 40 although for some types of service blends as light as S. A. E. 20 and as heavy as S. A. E. 50 may be employed.

Although certain specific embodiments of my invention have been described, I am aware that many modifications thereof are possible, therefore my invention is not to be restricted thereto except insofar as is necessitated by the prior art and by the appended claims.

I claim:

1. A Diesel engine lubricant comprising a paraffinic lubricating oil having a 90% distillation temperature at about 1 mm. pressure of less than about 500° F. and an iso-olefin polymer having a 90% distillation temperature at about 1 mm. pressure of about 450° F. to about 700 F. said iso-olefin polymer being used in a quantity sufficient to give a resultant Diesel engine lubricant having a markedly lower carbonization susceptibility than said paraffinic lubricating oil.

2. A Diesel engine lubricant comprising a paraffinic lubricating oil having a 90% distillation temperature at about 1 mm. pressure of less than about 500° F. and a viscosity index greater than about 70 and an iso-olefin polymer having a 90% distillation temperature at about 1 mm. pressure of about 450° F. to about 700° F., said iso-olefin polymer being added in a quantity sufficient to give a resultant Diesel engine lubricant having a markedly lower carbonization susceptibility than said paraffinic lubricating oil.

3. A Diesel engine lubricant described in claim 1 in which the iso-olefin polymer is obtained by subjecting an iso-olefin to the action of $BF_3$ catalyst at a temperature of about 0° C., recovering the heavier oily product by neutralization of the excess catalyst, removing the unreacted light hydrocarbons by evaporation and distilling the resulting product under vacuum to produce an oil having a viscosity at 100° F. of from about 550 seconds to about 850 seconds, a viscosity at 210° F. of from about 55 seconds to about 75 seconds and a 90% distillation temperature of from about 450° F. to about 700° F.

4. A Diesel engine lubricant comprising from about 30% to about 60% of a paraffinic lubricating oil having a 90% distillation temperature at 1 mm. pressure of less than about 500° F. and a viscosity index of from about 70 to about 100 and from about 40% to about 70% of an isobutylene polymer having a viscosity at 100° F. of from about 550 seconds to about 850 seconds, a viscosity at 210° F. of from about 55 seconds to about 75 seconds and a 90% distillation temperature of from about 450° F. to about 700° F.

5. A Diesel engine lubricant comprising a paraffinic lubricating oil having a 90% distillation temperature at about 1 mm. pressure of less than about 500° F. and a viscosity index greater than about 70 and an isobutylene polymer having a 90% distillation temperature at about 1 mm. pressure of about 450° F. to about 700° F., said isobutylene polymer being added in a quantity sufficient to give a resultant Diesel engine lubricant having a markedly lower carbonization susceptibility than said paraffinic lubricating oil.

6. A Diesel engine lubricant as described in claim 2 in which the iso-olefin polymer has a Saybolt Universal viscosity at 100° F. of from about 550 seconds to about 850 seconds and a Saybolt Universal viscosity at 210° F. of from about 55 seconds to about 75 seconds.

7. A Diesel engine lubricant as described in claim 5 in which the isobutylene polymer has a Saybolt Universal viscosity at 100° F. of from about 550 seconds to about 850 seconds and a Saybolt Universal viscosity at 210° F. of from about 55 seconds to about 75 seconds.

8. A Diesel engine lubricant comprising from about 10% to about 80% of a paraffinic lubricating oil having a 90% distillation temperature at about 1 mm. pressure of less than about 500° F. and from about 20% to about 90% of an iso-olefin polymer having a 90% distillation temperature at about 1 mm. pressure of about 450° F. to about 700° F.

9. A Diesel engine lubricant as described in claim 8 in which the iso-olefin polymer is an isobutylene polymer.

10. A Diesel engine lubricant as described in claim 8 in which the iso-olefin polymer has a Saybolt Universal viscosity at 100° F. of from about 550 seconds to about 850 seconds and a Saybolt Universal viscosity at 210° F. of from about 55 seconds to about 75 seconds.

MAURICE H. ARVESON.